May 16, 1939.  C. B. LANSING  2,158,629
CUTTING MACHINE FOR STONE OR OTHER MATERIAL
Filed Feb. 23, 1938   2 Sheets-Sheet 1
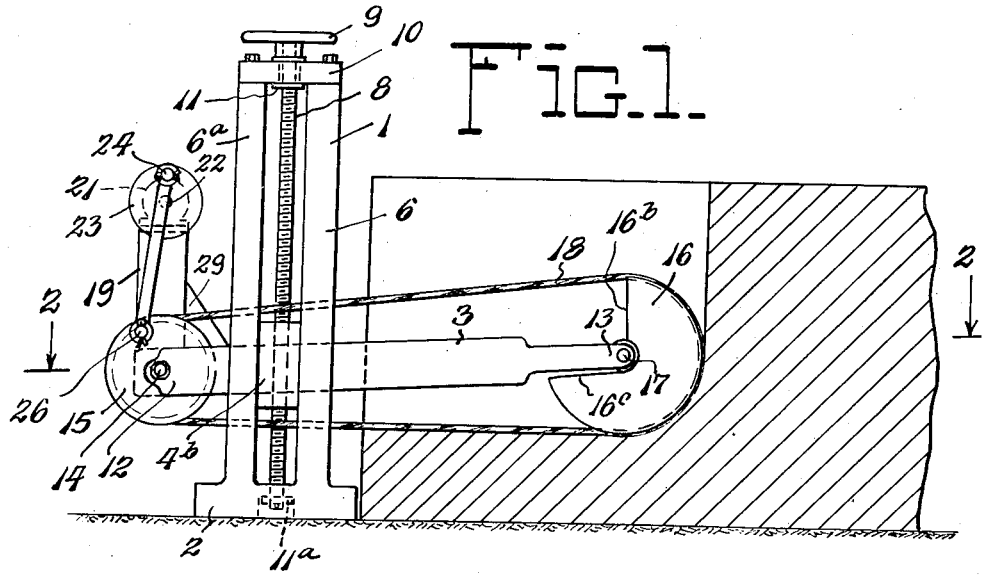
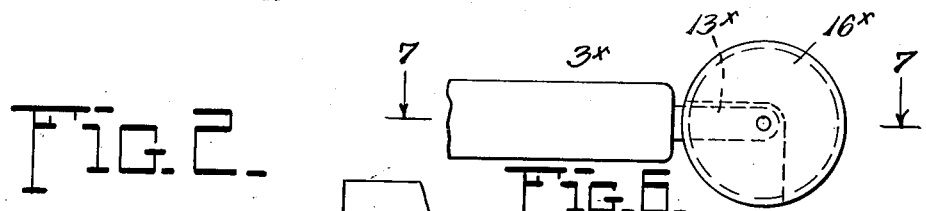
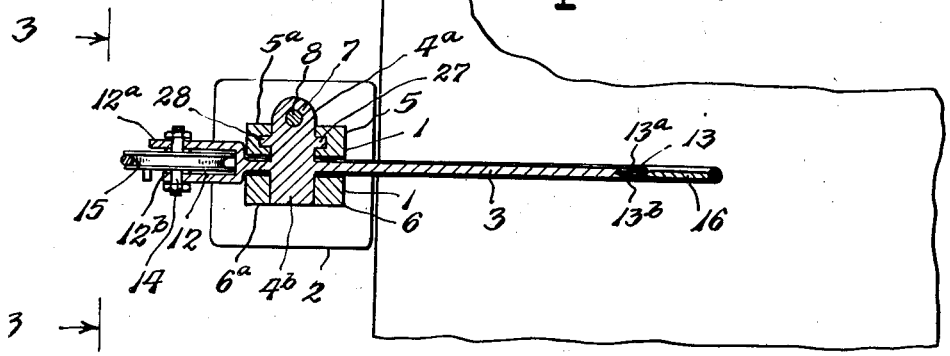
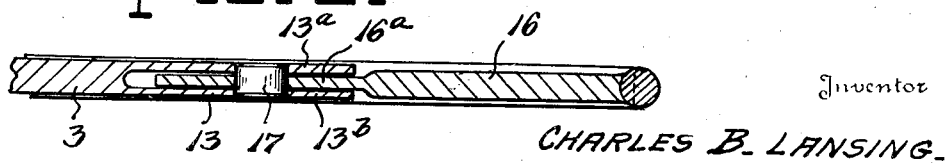
Inventor
CHARLES B. LANSING
By Robb & Robb
ATTORNEYS

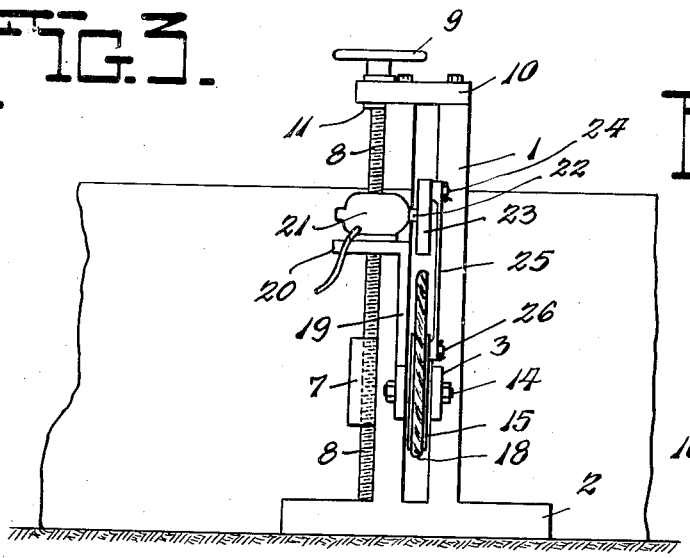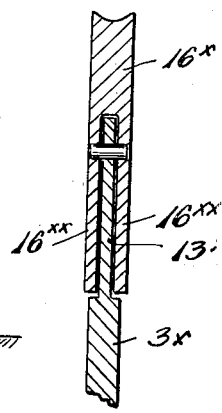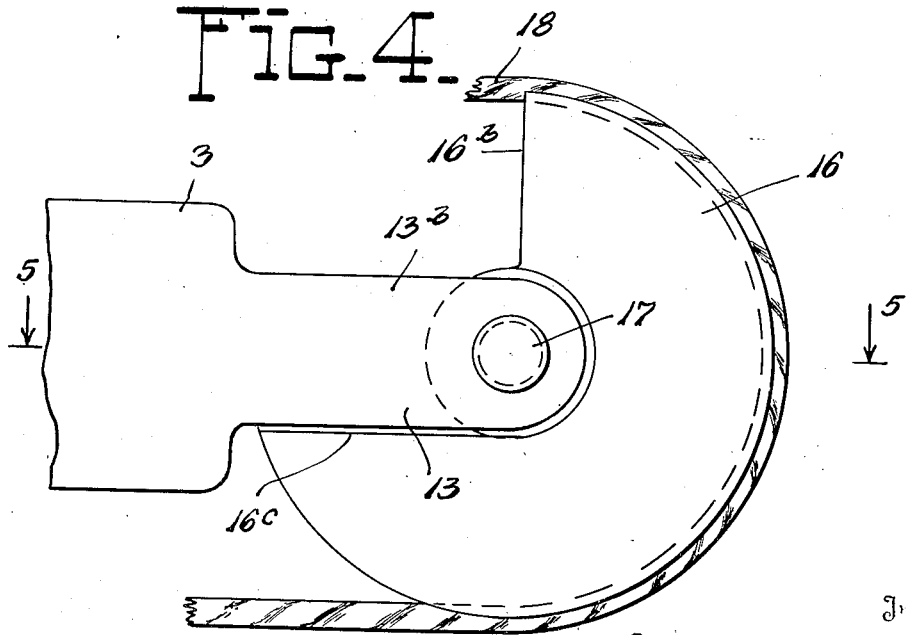

Patented May 16, 1939

2,158,629

UNITED STATES PATENT OFFICE 2,158,629

CUTTING MACHINE FOR STONE OR OTHER MATERIAL

Charles B. Lansing, Gates Mills, Ohio

Application February 23, 1938, Serial No. 192,089

4 Claims. (Cl. 125—21)

This invention relates to the art of cutting stone, coal, and like material, and more particularly to machines for performing such cutting operations employing cutting means of the endless wire or belt type.

Such cutting machines ordinarily comprise a carrier of some type upon which are mounted pulleys over which is trained the endless wire or belt which performs the cutting function as movement is imparted to it by rotation of the pulleys from a source of power.

Heretofore there has been difficulty in the use of the type of cutting device above generally described where the entire cutting means, including the carrier, a pulley, and the endless member, is required to move through the material being cut as the cutting operation progresses. This difficulty resides in the fact that the width of the cut made by the endless member is narrower than the carrier and pulley which supports said member, and this fact prevents the carrier and pulley from moving through the cut portion in the material as the cutting operation progresses.

The problem, therefore, has been to design a carrier and attendant pulley for this type of cutting means which will be narrower than the width of the cut made by the endless means in the material by the cutting operation, and the present invention accomplishes this object.

The carrier of my invention comprises bifurcated portions at either end thereof, between which furcations pulleys are rotatably carried, one of said pulleys being of about the same width as the bifurcated portion of the carrier which is to extend into the cut of material, said pulley being what may be termed an "interrupted pulley" having a cut-out portion and a central portion narrower than the bifurcated portion of said carrier so as to be carried between the furcations thereof.

Since this latter mentioned pulley cannot of course make a complete revolution, a reciprocating motion is imparted to the endless cutting member so that the pulleys rotate backward and forward through a small arc.

The invention will now be more particularly described in conjunction with the drawings, in which Figure 1 is a side view of a cutting machine of the invention.

Figure 2 is a horizontal sectional view taken on the line 2—2 of Figure 1.

Figure 3 is an end view taken in the direction of line 3—3 of Figure 2.

Figure 4 is an enlarged view of a portion of the carrier and the interrupted pulley.

Figure 5 is a horizontal section taken on the line 5—5 of Figure 4.

Figures 6 and 7 are views like Figures 4 and 5, respectively, of a modification.

A stand 1 having a base portion 2 carries the carrier or arm 3 which is adjustable upwardly and downwardly relative to said stand 1. The carrier 3 is supported by guiding members 4a and 4b offstanding at opposite sides of said carrier. Said guiding members cooperate with vertical guides 5, 5a, 6, and 6a of the stand 1, so that the carrier member 3 is vertically slidable in said guides in relation to the stand 1. Tongues 27 and 28 formed on the guiding member 4a may cooperate with grooves in the guides 5 and 5a if desired. Said guiding member 4a has an internally threaded sleeve portion 7 cooperating with the adjusting or feed screw shaft 8, to which is keyed the operating wheel 9. Said screw shaft 8 is suitably journalled in the top portion 10 and the base member 2 of the stand 1, and maintained against vertical movement respecting the stand 1 by a bushing 11, and retaining the ring 11a.

The carrier 3 is bifurcated at its ends as at 12 and 13. Extending through the furcations 12a and 12b is a shaft 14 upon which is rotatably mounted a wheel or pulley 15. The bifurcated portion 13 is the same width as the main portion of the carrier 3, while the bifurcated portion 12 need not be so limited in dimension since it does not enter the cut to be made.

An interrupted wheel or pulley 16, of approximately the same width as the carrier 3 and having a section cut out, has a very narrow central bearing portion 16a which is carried between the furcations 13a and 13b. Said pulley 16 is rotatably mounted upon the carrier 3 by means of a pivot pin 17 passing through the furcations 13a and 13b and the narrow central portion 16a of the wheel 16. The pulleys 15 and 16 may be termed carrier wheels.

An endless wire or cutting member 18 is trained over the pulleys 15 and 16. Extending upwardly from the furcation 12a is an arm 19 having a supporting bracket 20 upon which is supported a motor 21. The drive shaft 22 of the motor 21 is drivingly connected to a wheel or disc 23 to which is eccentrically pivoted as at 24 the upper end of a pitman 25. The lower end of said pitman 25 is pivoted eccentrically, as at 26, to the pulley 15. The driving wheel 23 and the wheel 15 are of such a size and the pitman 25 of such a length, that the rotation of the wheel 23 will cause the wheel 26 to rotate only through a small arc rather than to make a complete revolution.

In operation, therefore, when the motor 21 is started, the rotation of the driving wheel 23 will impart a reciprocatory movement to the endless cutting member 18 through pitman 25 and pulley 15. The reciprocatory movement imparted to the cutting member 18 will cause the interrupted pulley 16 to reciprocate within an arc defined by the cut out portion of said pulley. Thus, the arc of movement of said interrupted pulley 16 will permit the edge 16c of the cut portion thereof to move close to the underside of the furcations 13a and 13b, and will permit the edge 16b to move close to the upper side of said furcations.

In practice the endless cutting member 18 may be of a diameter the same as or greater than the width of the pulley member 16, so that when the carrier 3 is placed in position such that the portion of the cutting member 18 engaging the uninterrupted circumference of the pulley 16 bears against material to be cut in the performance of the cutting operation, the width of the cut produced will be equal to or greater than the width of the carrier 3 and its coacting pulley 16. As the cutting operation progresses, therefore, and the cut becomes deeper, that portion of the cutting mechanism which performs the cutting operation will move downwardly through the cut portion of the material being operated upon.

Because of the reciprocating movement of the cutting member 18, under conditions of use of the invention, the cutting member 18 engaging the uninterrupted circumference of the pulley 16 will rotate slightly in a direction transverse to its axis. This is due to the fact that said member is usually made of twisted wire. Also, there is a slight longitudinal slippage of the member 18 incident to the friction generated in the cutting action, the pulleys or members 15 and 16 permitting such slippage. Thus in the operation of the cutting member fresh sections thereof are moved to the cutting point or position over the uninterrupted periphery of the pulley 16.

While provision for the movement of the cutting means through the cut portion of stone vertically only has been illustrated, I do not intend to be limited to such provision. The invention provides a construction in which the cutting means is adapted to pass through the cut portion of the material as the cutting operation progresses, and there is no intention to limit in any manner the direction in which such movement may take place. Within the purview of the invention, it is contemplated, for instance, to provide means for supporting the carrier so that it will be movable into, or toward and away from, the work, horizontally or otherwise.

The endless cutting member may be provided, if desired, with projections of abrasive material, or cutting knives, or diamonds, or any suitable adjunct to the cutting process of a like nature. Additionally, abrasive material such as a mixture of sand and water may be fed to the area of contact of the cutting means with the material being operated upon.

Supplemental bracing means for the arm 19 may be provided by a brace 29 connected to and extending between the said arm and the furcation 12a.

While my above description refers to a carrier having a bifurcated end 13 adjoining the pulley 16, and an interrupted pulley 16 having a section cut out, I do not wish to be limited to this exact construction as the same result may be obtained by the carrier having a narrowed end at 13x with a pulley 16x having an intermediate portion cut away, or spaced side portions 16xx, so to speak, the latter to receive the narrowed end of the carrier portion 13x adjacent to said pulley 16x. The latter structure is depicted in Figures 6 and 7.

Having thus described my invention, what I claim as new and desire to secure by Letters Patent of the United States, is—

1. A stone cutting machine of the class described, comprising, in combination, a carrier having a main portion and a bifurcated portion at an end thereof, a carrier wheel mounted between the furcations of said bifurcated portion, said bifurcated portion being of a width no greater than the main portion of said carrier, said wheel having a narrower central portion extending between the furcations of said bifurcated portion, and a cutting member supported by said carrier wheel, said cutting member being of a width no less than said carrier wheel, whereby said main portion of said carrier, and said carrier wheel may pass through the cut portion of the material being operated upon as the cutting operation progresses.

2. A stone cutting machine of the class described, comprising, in combination, a carrier having a main portion and bifurcated portions at either end thereof, one of said bifurcated portions being of a width no greater than said main portion, an interrupted carrier wheel rotatably mounted at said last mentioned bifurcated portion and being of substantially the same width as said main portion and having a narrower central portion extending between the furcations of said last mentioned bifurcated portion, another carrier wheel carried between the furcations of the other of said bifurcated portions, and a cutting member supported by said carrier wheels and being of a width no less than the width of the main portion of said carrier, whereby said main portion and said interrupted carrier wheel may pass through the cut portion of material being operated upon as the cutting operation progresses, said last mentioned bifurcated portion extending into the space provided by the interrupted portion of said carrier wheel.

3. A stone cutting machine of the class described, comprising, in combination, a carrier having a main portion and wheel carrying portions at either end thereof, one of said wheel carrying portions being of a width no greater than said main portion, an interrupted carrier wheel mounted at said last mentioned wheel carrying portion and being of substantially the same width as said main portion, another carrier wheel mounted at the other of said wheel carrying portions, and a cutting member supported by said carrier wheels and of a width no less than the width of said main portion, whereby said main portion and said interrupted carrier wheel may pass through the cut portion of material being operated upon as the cutting operation progresses.

4. A stone cutting machine of the class described, comprising, in combination, a carrier having a main portion and wheel carrying portions at either end thereof, one of said wheel carrying portions being of a width no greater than said main portion, an interrupted carrier wheel mounted at said last mentioned wheel carrying portion and being of substantially the same width as said main portion, another carrier wheel mounted at the other of said wheel carrying portions, a cutting member supported by said carrier wheels and of a width no less than the width of said main portion, whereby said main portion and said interrupted carrier wheel may pass through the cut portion of material being operated upon as the cutting operation progresses, and means for imparting partial rotating movement to one of said carrier wheels whereby said interrupted carrier wheel may be caused to rotate through a small arc.

CHARLES B. LANSING.